US012805424B2

(12) United States Patent
Gilstring

(10) Patent No.: US 12,805,424 B2
(45) Date of Patent: Nov. 24, 2026

(54) AGRICULTURAL IMPLEMENT AND METHOD FOR FEEDING GRANULAR MATERIAL

(71) Applicant: Väderstad Holding AB, Väderstad (SE)

(72) Inventor: Gert Gilstring, Vadstena (SE)

(73) Assignee: Väderstad Holding AB, Väderstad (SE)

( * ) Notice: Subject to any disclaimer, the term of this patent is extended or adjusted under 35 U.S.C. 154(b) by 330 days.

(21) Appl. No.: 18/576,809

(22) PCT Filed: Jul. 5, 2022

(86) PCT No.: PCT/SE2022/050686
§ 371 (c)(1),
(2) Date: Jan. 5, 2024

(87) PCT Pub. No.: WO2023/282830
PCT Pub. Date: Jan. 12, 2023

(65) Prior Publication Data

US 2024/0306533 A1 Sep. 19, 2024

(30) Foreign Application Priority Data

Jul. 6, 2021 (SE) .................................... 2150888-2

(51) Int. Cl.
*A01C 7/04* (2006.01)
*A01C 15/00* (2006.01)
*A01C 15/04* (2006.01)

(52) U.S. Cl.
CPC ............ *A01C 7/046* (2013.01); *A01C 15/007* (2013.01); *A01C 15/04* (2013.01)

(58) Field of Classification Search
CPC .............................. A01C 7/0443; A01C 7/046
See application file for complete search history.

(56) References Cited

U.S. PATENT DOCUMENTS 4,450,979 A 5/1984 Deckler
4,572,726 A 2/1986 Van Abbema
(Continued)

FOREIGN PATENT DOCUMENTS

DE 102016218258 A1 3/2017
EP 1243172 A2 9/2002
(Continued)

*Primary Examiner* — Matthew R Buck
(74) *Attorney, Agent, or Firm* — COATS & BENNETT, PLLC

(57) ABSTRACT

An agricultural implement (1) for distributing granular material to ground over which the agricultural implement is travelling comprises a container (14) for the material, a fan (16) for producing an air flow in a primary channel (161, 162), a driveable volumetric feeder unit (141): for feeding the material to the primary channel (161, 162), such that a material laden air flow is produced, a plurality of secondary channels (18) for transporting the material laden air flow, and a plurality of output units (17) which are each connected to one of said secondary channels (18) and have an outlet channel (174) for discharging the material to the ground. Each of the output units (17) comprises a singulator (171), which has a singulating part (1714) which is movable in a singulating space and has a plurality of through-holes, and over which a pressure difference can be applied, such that the singulating part has a high-pressure side and a low-pressure side. The singulator (171) has a material inlet (1711) and an air inlet (1712), which connect to the singulating space on the high-pressure side. A material outlet (1713) of the singulator connects to the outlet channel (174).

21 Claims, 8 Drawing Sheets

(56) References Cited

U.S. PATENT DOCUMENTS

| | | | | |
|---|---|---|---|---|
| 2012/0227647 | A1 | 9/2012 | Gelinske et al. | |
| 2015/0189827 | A1* | 7/2015 | Gilstring | A01C 7/082 222/1 |
| 2015/0189828 | A1* | 7/2015 | Gilstring | B65G 53/06 406/171 |
| 2015/0282422 | A1* | 10/2015 | Hahn | A01C 7/20 111/185 |
| 2016/0095274 | A1* | 4/2016 | Wendte | A01B 79/005 111/200 |
| 2020/0000010 | A1* | 1/2020 | Jagow | A01C 7/082 |
| 2023/0389464 | A1* | 12/2023 | Luebben | A01C 7/0443 |

FOREIGN PATENT DOCUMENTS

| | | | | |
|---|---|---|---|---|
| EP | 1537768 | A1 * | 6/2005 | A01C 7/105 |
| EP | 2853141 | A1 | 4/2015 | |
| EP | 2854500 | B1 | 4/2016 | |
| WO | 2010059101 | A1 | 5/2010 | |
| WO | 2013180619 | A1 | 12/2013 | |
| WO | 2013180620 | A1 | 12/2013 | |
| WO | 2018236275 | A1 | 12/2018 | |
| WO | 2021069607 | A1 | 4/2021 | |
| WO | 2021089448 | A1 | 5/2021 | |

* cited by examiner

AGRICULTURAL IMPLEMENT AND METHOD FOR FEEDING GRANULAR MATERIAL

TECHNICAL FIELD

This document relates to an agricultural implement for feeding granular material, such as seeds, fertilizer or pesticide, to ground over which the agricultural implement is travelling. Such agricultural implements can be in the form of seed drills and/or drills for feeding fertilizer and/or pesticide.

The document also relates to methods for feeding granular material to ground over which an agricultural implement is travelling.

BACKGROUND

Agricultural implements for different types of sowing are known. Two main types of such agricultural implements are conventional seed drills, which use volumetric feeding and which are generally controlled so as to output a certain volume or weight of seed per area unit, and so-called precision seed drills which, with the aid of a singulating device, place each seed at a defined distance from preceding and subsequent seeds.

A volumetrically fed seed drill is generally constructed such that the material is fed from a seed box, located centrally on the agricultural implement, with the aid of a driven feeder which controls a feeding rate for a given volume per unit of time. A fan generates an air flow in a primary channel, and the feeder feeds the material to the primary channel, where said material is taken up by the air flow and forms an material laden air flow.

The material laden air flow is conveyed to a distributor, with which the material laden air flow is distributed to a plurality of secondary channels which lead from the distributor to a respective output unit, which can be some form of furrow opener.

A precision seed drill, by contrast, is generally constructed such that the material is feed from a seed box, located centrally on the agricultural implement, with the aid of gravity to a plurality of take-up zones. A fan generates an air flow in a primary channel which, by way of an air distributor such as a manifold, connects to the take-up zones, where the material is taken up in a plurality of secondary channels.

The secondary channels lead to a respective row unit, where the material is singulated and fed to the ground.

There is a requirement to be able to increase the precision of conventional seed drills, in order thereby to be able to optimize emergence.

There is also a requirement to achieve good economy of production by allowing the re-use of parts between different types of seed drills.

SUMMARY

An object of the present document is to provide an improved concept of feeding material in agricultural implements of the type indicated in the introduction.

The invention is defined by the attached independent patent claims. Embodiments are set forth in the attached dependent patent claims, in the description that follows and in the accompanying drawings.

According to a first aspect, an agricultural implement is provided for distributing granular material to ground over which the agricultural implement is travelling, comprising a container for the material, a fan for producing an air flow in a primary channel, a driveable volumetric feeder unit for feeding the material to the primary channel, such that an material laden air flow is produced, a plurality of secondary channels for transporting the material laden air flow, and a plurality of output units which are each connected to one of said secondary channels and have an outlet channel for discharging the material to the ground. Each of the output units comprises a singulator, which has a singulating part which is movable in a singulating space and has a plurality of through-holes or recesses, and over which a pressure difference can be applied, such that the singulating part has a high-pressure side and a low-pressure side. The singulator has a material inlet and an air inlet, which connect to the singulating space on the high-pressure side. A material outlet of the singulator connects to the outlet channel.

Feeder units are known and comprise, for example, a driven blade wheel or a screw, which controls the rate at which material is fed from a container to an injection point where the material is taken up in the air flow.

In some embodiments, a single feeder unit can provide a plurality of singulators with material laden air flow, by means of a distributor being arranged between the feeder unit and the singulators.

In other embodiments, a plurality of centrally located feeder units can be provided, each feeder unit being connected to one singulator and providing the latter with material. This can be advantageous in terms of permitting greater precision in the quantity of material fed to the singulator.

By providing the output units with a singulator of the positive pressure type, it is possible to achieve reliable and energy-efficient feeding of material, including material of the kind that is normally fed volumetrically.

A singulator of the positive pressure type is connected to a source of air at positive pressure, i.e. a source of air at a higher pressure than the surrounding atmosphere, for example a fan. The material outlet of the singulator connects to the singulator on the positive pressure side, such that the positive pressure can be used to drive the material from the material outlet of the singulator to the ground where the material is to be placed.

At least some, preferably all, of the output units comprise a separator.

The separator can comprise an inlet connected to one of the secondary channels, a material outlet connected to the material inlet of the singulator, and an air outlet connected to the air inlet of the singulator.

By using a separator, it is possible, with the aid of a single stream of material laden air, to provide the singulator both with material and with pressurized air, without agitating the material on the high-pressure side of the singulator.

The separator can comprise at least one of a cyclone separator, a separator of the filter type, and a gravitational separator. A gravitational separator can have an impact part towards which an incoming flow of air can be conveyed, such that the material rebounds and loses at least some of its kinetic energy and thus more easily separates from the air flow.

A cyclone separator is a device known per se, in which the air is caused to swirl around so that larger particles are flung outwards and separated.

By using a cyclone as separator, it is possible to achieve effective separation without losing too much of the pressure and kinetic energy of the air flow, such that this kinetic energy and pressure can be utilized for pressurizing the singulator.

A separator of the filter type can comprise a membrane or wall with through-openings which allow air to pass through, but not the material. The wall can thus be formed by a grating, a plurality of bars, a plurality of holes, a netting, a plurality of ribs or the like.

A gravitational separator is a separator in which the material lade air flow is guided from an inlet channel into a space with a substantially greater flow area than the inlet channel, such that the flow velocity decreases and the material drops down and can be collected.

By combining more than one type of separator, it is possible to separate material of different sizes in steps, thus ensuring a good function of the separator and thereby achieving improved operational reliability of the output unit as a whole.

In particular, it is advantageous to combine a separator of the filter type with a cyclone separator or gravitational separator arranged upstream of the filter, since the risk of the filter clogging up is thus reduced.

The separator and the singulator can be mounted releasably on each other.

The separator and the singulator can be integrated with each other.

The separator and the singulator can thus be mounted in a common casing, the air outlet of the separator being able to connect directly to the air inlet of the singulator. Moreover, the material outlet of the separator can connect directly to the material inlet of the singulator.

The separator can have a separator space of substantially circular cross section, wherein the inlet is designed such that it produces a direction of flow which is substantially tangential with respect to the separator space, wherein the material outlet is located at a lower part of the separator space, and wherein the air outlet is located at an upper portion of the separator space.

At least a lower portion of the separator space can narrow in a downward direction.

The separator can comprise a channel having a wall portion which is apertured over at least part thereof, such that air but not material can pass through the wall portion to the air outlet.

The agricultural implement can further comprise a distributor, which has a distributor inlet connected to the primary channel, and a plurality of distributor outlets, which connect to a respective singulator.

The agricultural implement can further comprise a level sensor for measuring a material level at the material outlet of the separator and/or in the singulating space.

According to a second aspect, an agricultural implement is provided for distributing granular material to ground over which the agricultural implement is travelling, comprising a container for the material, a fan for producing an air flow, a plurality of take-up zones to which the material falls by gravity from the container in order to be taken up by the air flow, such that an material laden air flow is obtained, a plurality of primary channels, each connected to a respective take-up zone, for transporting the material laden air flow, a plurality of output units which each comprise a separator comprising an inlet connected to one of said primary channels, a material outlet and an air outlet, a singulator, which has a singulating part which is movable in a singulating space and has a plurality of through-holes or recesses, and over which a pressure difference can be applied, such that the singulating part has a high-pressure side and a low-pressure side, a material inlet connected to the material outlet of the separator, and an air inlet connected to the air outlet of the separator. The material inlet and air inlet of the singulator connect to the singulating space on the high-pressure side. The separator comprises a cyclone separator, and a wall portion arranged in the cyclone separator, which wall portion is apertured such that air, but not the material, is able to pass through the wall portion to the air outlet.

The wall portion can be arranged releasably relative to the cyclone separator.

The wall portion can extend substantially vertically in the cyclone separator, such that an air flow through the material portion can be reduced as the material level increases in the cyclone separator.

By arranging such a wall portion in the cyclone separator, it is possible for the material laden air flow to be decelerated when there is sufficient material present in the channel. This creates a desired form of feeding of material to the output unit.

In the agricultural implement, the air flow generated by the fan can be used for pressurizing the singulator. In particular, the fan can be the sole source for pressurizing the singulator. Alternatively, a further fan can be used for pressurizing the singulator.

By using the air flow to pressurize the singulator, it is possible to save energy and to provide a simpler design of the agricultural implement as a whole.

The connection between the air outlet of the separator and the air inlet of the singulator can be the only source the singulator has to a positive air pressure.

Alternatively, a further source of positive air pressure can be connected to the air inlet of the singulator.

Said further source of positive air pressure can be a second fan.

Alternatively, said further source of positive air pressure can be a channel which connects to the primary channel upstream of the container.

The agricultural implement can further comprise a bypass channel, for selective bypassing of the singulator, such that said material laden air flow is conveyed directly to an outlet.

According to a third aspect, a method is provided for distributing granular material to ground over which an agricultural implement is travelling, which method comprises producing a container for the material, using a fan to produce an air flow in a primary channel, driving a volumetric feeder unit for feeding the material to the primary channel, such that an material laden air flow is produced, transporting the distributed material laden air flow to a plurality of output units, and, in each of the output units, feeding the material to a singulator of the positive pressure type.

The method can further comprise separating the material from the material laden air flow, such that a material flow and an air flow are formed, and using the air flow to pressurize the singulator.

The method can further comprise conveying the material laden air flow through a cyclone separator, such that material is separated from the material laden air flow.

The method can further comprise conveying the material laden air flow through a channel, the latter having a wall portion through which air, but not the material, is able to pass.

The method can further comprise conveying the material laden air flow through a channel with an increasing flow area, such that the material laden air flow is decelerated, and material is separated from the material laden air flow.

The method can further comprise distributing the material laden air flow to a plurality of distributor outlets, and transporting the distributed material laden air flow from said distributor outlets to said plurality of output units.

The method can further comprise measuring a material level in the singulator or in the separator, and controlling the feeder unit on the basis of said material level.

According to a fourth aspect, a method is provided for distributing granular material to ground over which an agricultural implement is travelling, which method comprises producing a container for the material, using a fan to produce an air flow, conveying the air flow through a plurality of take-up zones to which the material falls by gravity from the container in order to be taken up by the air flow, such that an material laden air flow is obtained, transporting the material laden air flow from said take-up zones to a plurality of output units, and, in each of the output units, separating the material from the material laden air flow, feeding the material to a singulator of the positive pressure type, and using the air flow to pressurize the singulator. The method uses a cyclone separator for said separation, and, in the cyclone separator, the material laden air flow is conveyed through a channel having a wall portion through which air, but not the material, is able to pass, such that the material laden air flow is choked when the channel is filled up with material.

A fifth aspect concerns use of a cyclone separator in an output unit of an agricultural implement, wherein an material laden air flow is fed to the cyclone separator, wherein material is separated from the air flow and fed to a singulating device of the positive pressure type, and wherein the air flow is used for pressurizing the singulating device.

DETAILED DESCRIPTION

Figure 1A:
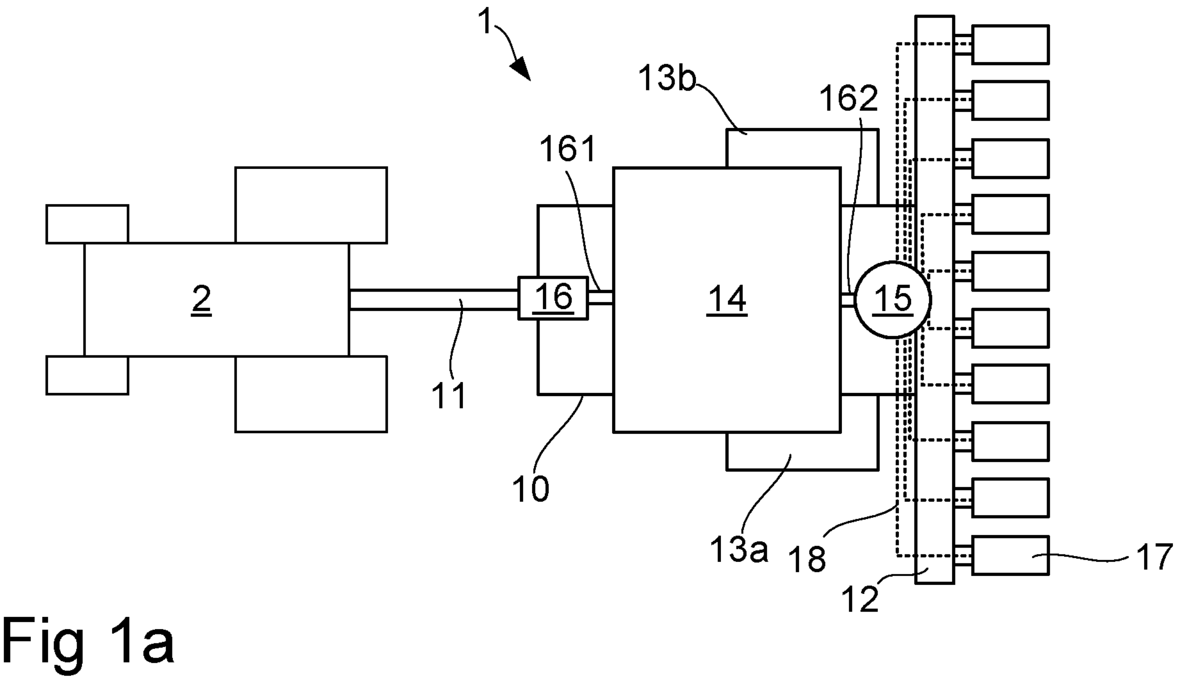
FIGS. 1*a*-*b* show schematic views of an agricultural implement 1, coupled to a towing vehicle 2.
Figure 1B:
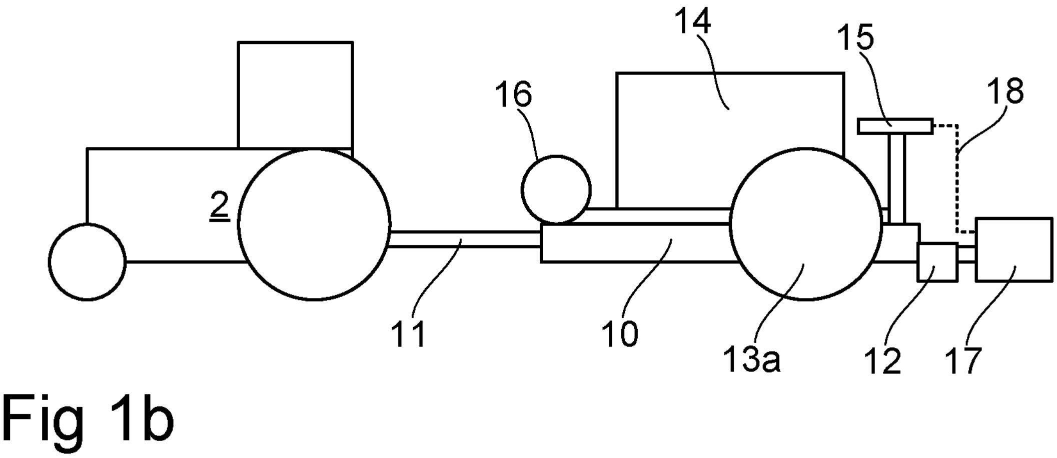

FIGS. 1*a*-1*b* show comprising an equipment agricultural implement 1, which is coupled to a towing vehicle 2, the latter being illustrated in the form of a tractor.

The agricultural implement 1 is illustrated in the form of a seed drill, which in FIGS. 1*a*-1*b* is a volumetrically fed seed drill.

The agricultural implement 1 has a main frame 10 to which a draw bar 11 and a transverse beam 12 are connected. The main frame 10, the draw bar 11 and the beam 12 can be arranged fixed relative to one another. One, two or several wheels 13*a*, 13*b* can be arranged to completely or partially support the agricultural implement 1. Alternatively, two or more of the parts 10, 11, 12 can be mounted movably relative to one another. Specifically, the beam 12 can comprise one, two, three, four or five portions which are movable relative to one another and which can be arranged such that the beam 12 can be folded between a work position of large width and a transport position of small width.

The main frame 10 can support one or more containers 14 for the material that is to be distributed, a fan 16 for generating an air flow that can be conveyed in a primary channel 161, 162, via a feeder 141 for feeding from the container, to a distributor 15 in which the material laden air flow is distributed via secondary channels 18 to a plurality of output units 17.

As is indicated in FIGS. 1*a*-1*b*, the output units can be placed in rows, side by side. Alternatively, adjacent output units can be mutually offset in the work direction F. The latter set-up can be obtained by distributing the output units over two or more frame parts arranged at a distance from one another in the work direction, or by providing every second output unit with a shorter or longer frame coupling. In this way, it is possible to produce a more compact row spacing.

Figure 2:
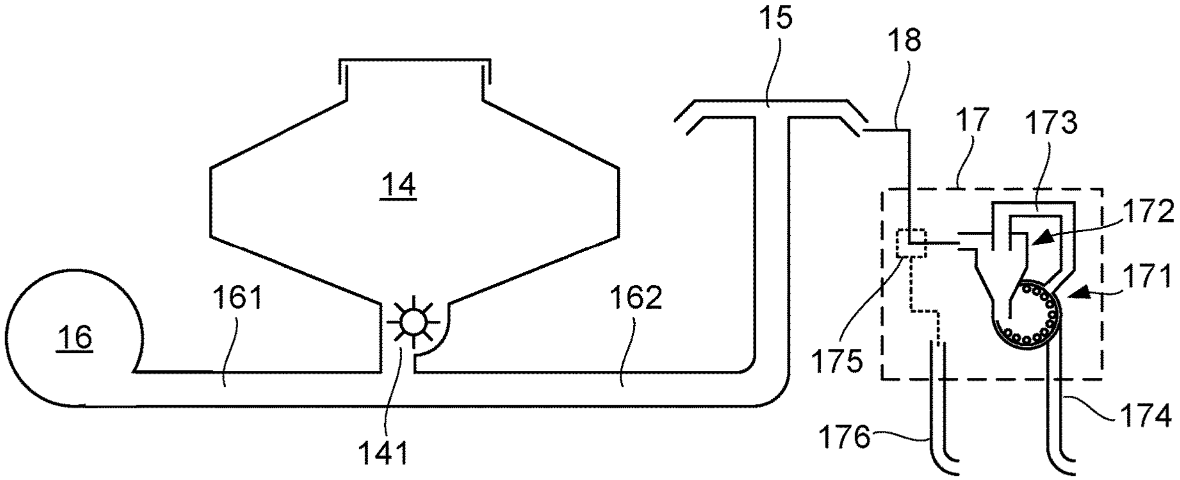
FIG. 2 shows a schematic view of a first embodiment of an arrangement for distributing granular material.

FIG. 2 shows a schematic view of a first embodiment of an arrangement for distributing granular material. The arrangement shown in FIG. 2 has a driveable feeder 141 for volumetric feeding of material from the container 14 to the primary channel 161, such that an material laden air flow is generated in a part 162 of the primary channel located downstream of the feeder 141. The material laden air flow is distributed, in a distributor 15, to a plurality of secondary channels 18.

Such distributors generally comprise a riser pipe which is connected to the primary channel and which extends substantially vertically and opens at the top into a distributor head, from which a secondary channel 18 extends.

Such distributors are known from WO2018236275 A1, for example.

The output unit 17 comprises a singulator 171, a separator 172 for separating the material from the material laden air flow, and a return channel 173 for returning the air from which the material has been separated, for pressurizing the singulator 171. The singulator 171 feeds singulated material to a material outlet, which leads the material to an outlet channel 174, such as a furrow opener or a fertilizer opener.

The singulator 171 can be designed in accordance with what is described in WO 2010059101 A1, for example.

Alternatively, the singulating part can be designed in accordance with what is disclosed in U.S. Pat. No. 4,450,979A, i.e. with a plurality of through-openings at the periphery of the singulating part, optionally in combination with depressions in the surface of the singulating part at each through-opening.

It is possible to provide the output unit 17 with a bypass valve 175, which allows the singulator 171 and the separator 172 to be bypassed. Such a bypass can convey the material laden air flow from the secondary channel 18 to a separate outlet channel 176 or to a connection to the outlet channel 174 downstream of the singulator 171.

Figure 3:
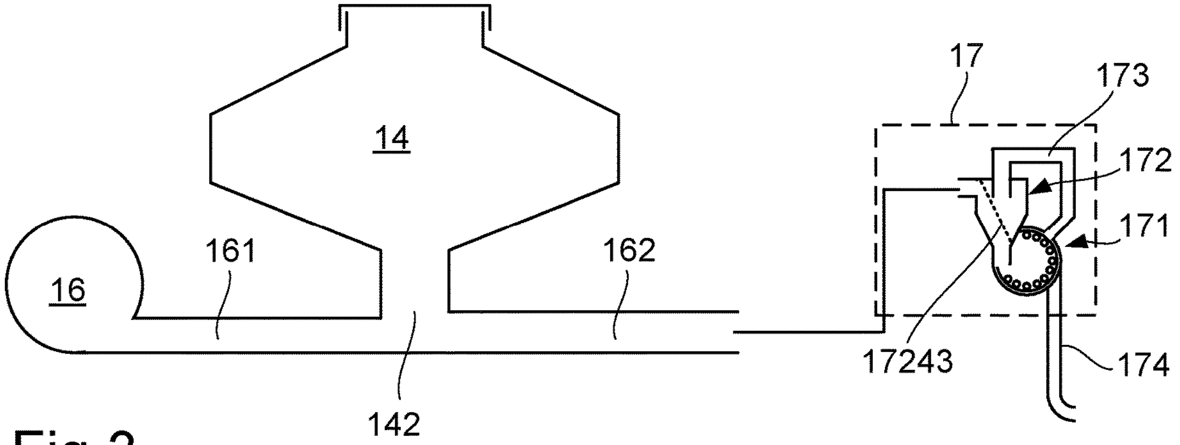
FIG. 3 shows a schematic view of a second embodiment of an arrangement for distributing granular material.

FIG. 3 shows a schematic view of a second embodiment of an arrangement for distributing granular material. Instead of having a driveable feeder 141, the arrangement shown in FIG. 3 has passive feeding in the form of a take-up zone 142 to which the air flow from the fan 16 is conveyed, such that material falling down in the take-up zone 142 is entrained by the air flow and thus forms an material laden air flow. A plurality of such take-up zones are arranged at the bottom of the container 14, for example alongside one another, and are each connected to one of a plurality of primary channels 161,162 that lead to a respective output unit 17. This results in robust feeding of material to the output units 17, which feeding is controlled by the quantity of material in the singulator.

Arranged in the separator 172 is an apertured wall portion 17243, which allows air, but not material, to pass through the wall portion 17243.

The wall portion 17243 can be designed substantially according to the principles that have been described in WO2013180620 A1. For example, the wall portion can be designed with through-slits (which can be formed for example between ribs) which run along a material flow direction at the wall portion. The slits can have a cross-sectional area which increases along the material flow direction, such that material that finds its way into the slits can be moved along the slits and loosen so as to be guided away from the wall portion. Alternatively or in addition, the slits can have a cross-sectional area which increases along an air flow direction through the wall portion and which can make it easier for material to make its way into the slits in order to be moved along the air flow direction and loosen in order to be guided away from the wall portion.

Figure 4:
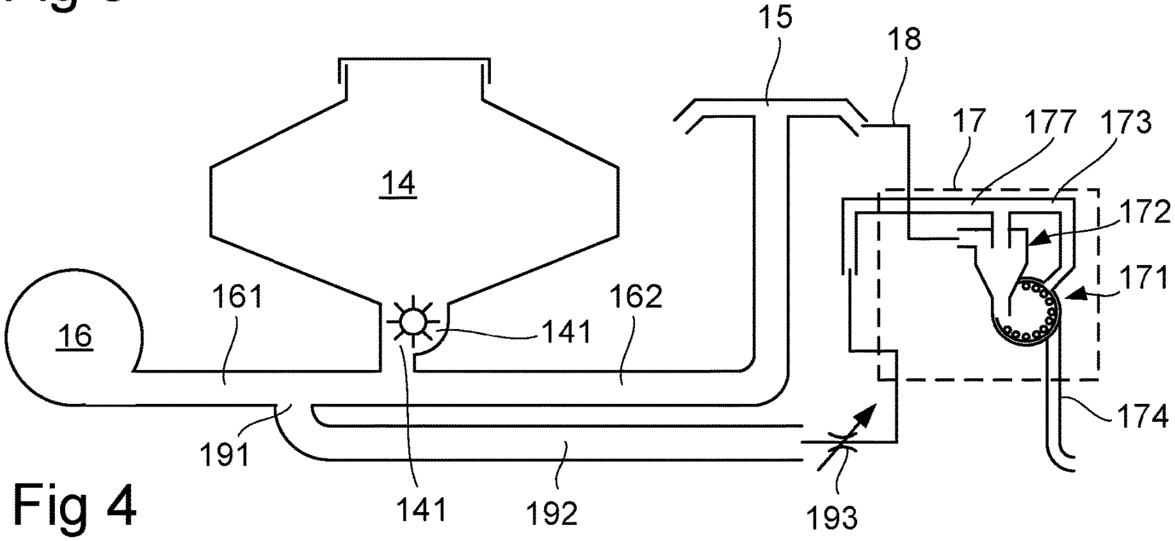
FIG. 4 shows a schematic view of a third embodiment of an arrangement for distributing granular material.

FIG. 4 shows a schematic view of a third embodiment of an arrangement for distributing granular material. The arrangement shown in FIG. 4 corresponds to what has been described with reference to FIG. 1, but with the difference that a separate pressurizing channel 192 is produced, which is coupled to a pressurizing inlet 177 of the singulator 171, such that the singulator can be supplied with extra air flow.

In the embodiment shown in FIG. 4, the pressurizing channel 192 is connected to a branch 191 from the primary channel 161, such that the pressurizing air flow is collected upstream of the feeder 141.

A regulator valve 193 can be provided in order to control pressure and/or flow in the pressurizing channel 192. It will be appreciated that the pressurizing channel 192 can be coupled to a manifold (not shown) for distributing the air flow to the plurality of output units 17.

Figure 5:
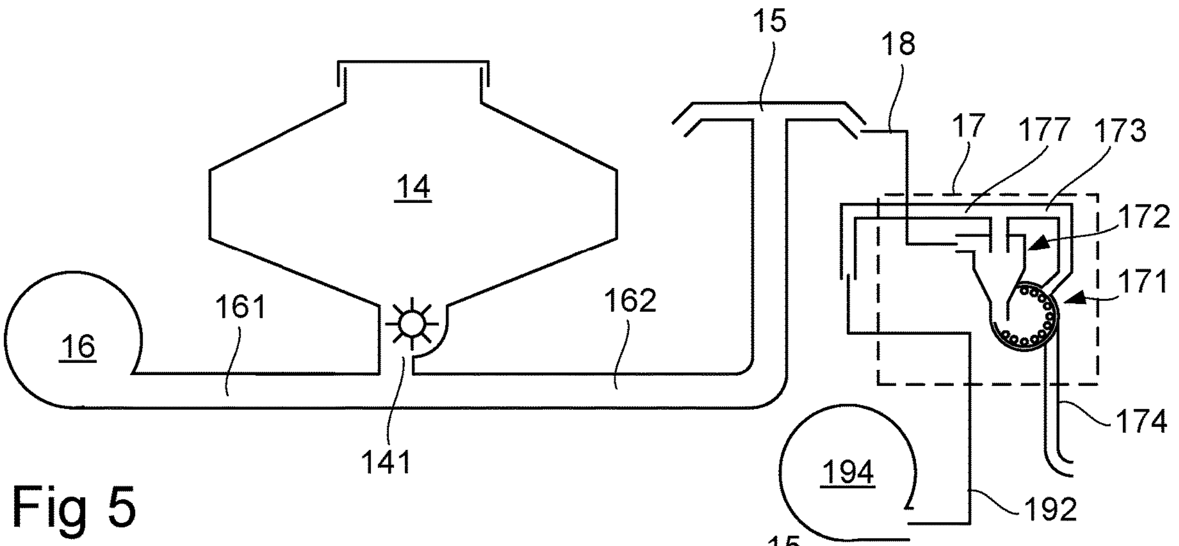
FIG. 5 shows a schematic view of a fourth embodiment of an arrangement for distributing granular material.

FIG. 5 shows a schematic view of a fourth embodiment of an arrangement for distributing granular material. The arrangement shown in FIG. 5 corresponds to the one shown in FIG. 4, but the pressurizing channel 192 is instead connected to a separate pressure source 194, such as a fan.

Figure 6:
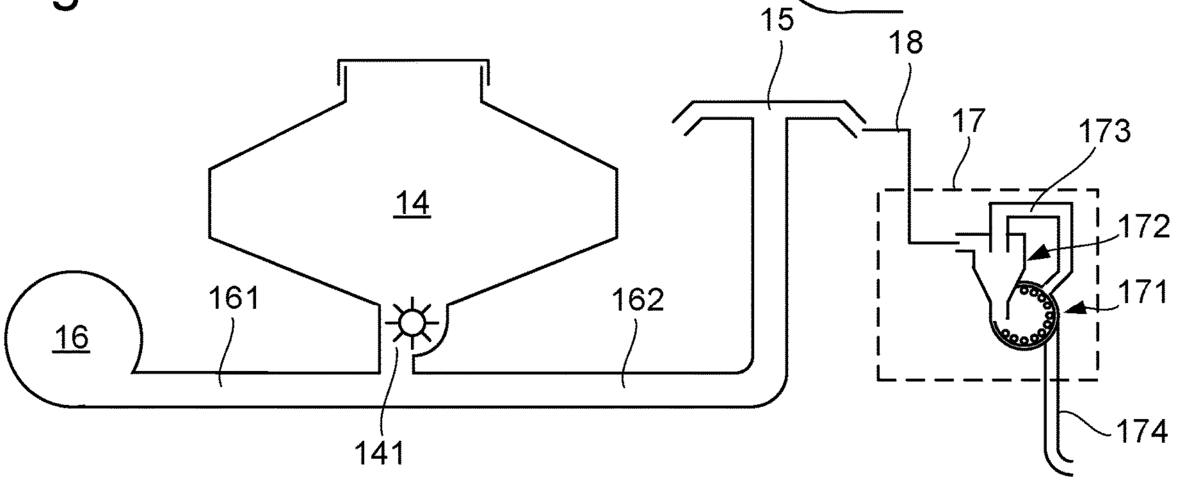
FIG. 6 shows a schematic view of a fifth embodiment of an arrangement for distributing granular material.

FIG. 6 shows a schematic view of a fifth embodiment of an arrangement for distributing granular material. The arrangement shown in FIG. 6 corresponds to the one shown in FIG. 1, but without a bypass valve 175.

Figure 7:
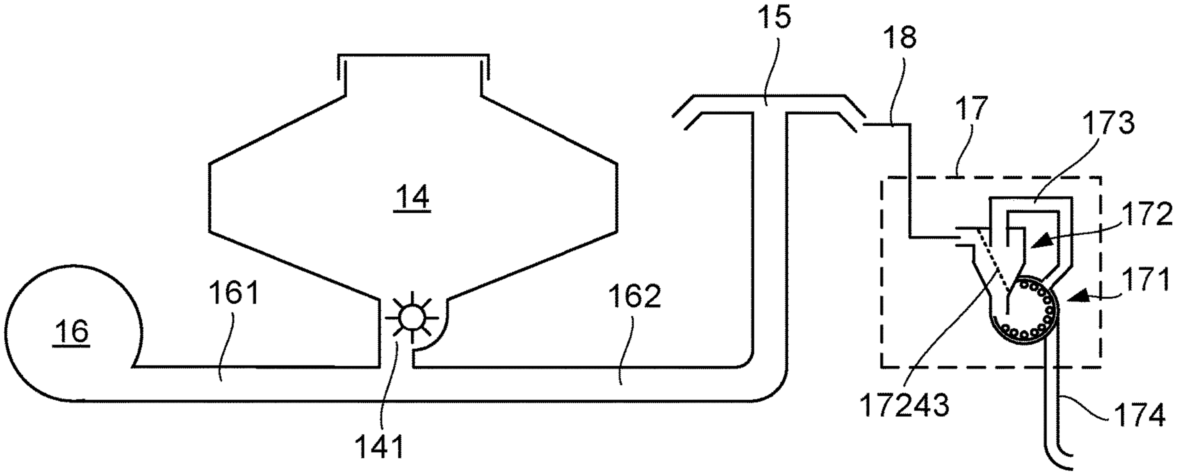
FIG. 7 shows a schematic view of a sixth embodiment of an arrangement for distributing granular material.

FIG. 7 shows a schematic view of a sixth embodiment of an arrangement for distributing granular material. The arrangement shown in FIG. 7 corresponds to the one shown in FIG. 6, but with an alternative embodiment of the separator 172, the latter having been provided with a separator cage, which will be described in more detail below.

In the separator 172 shown in FIG. 7, there is also an apertured wall portion 17243 which can be designed in accordance with what has been described with reference to FIG. 3.

Figure 8:
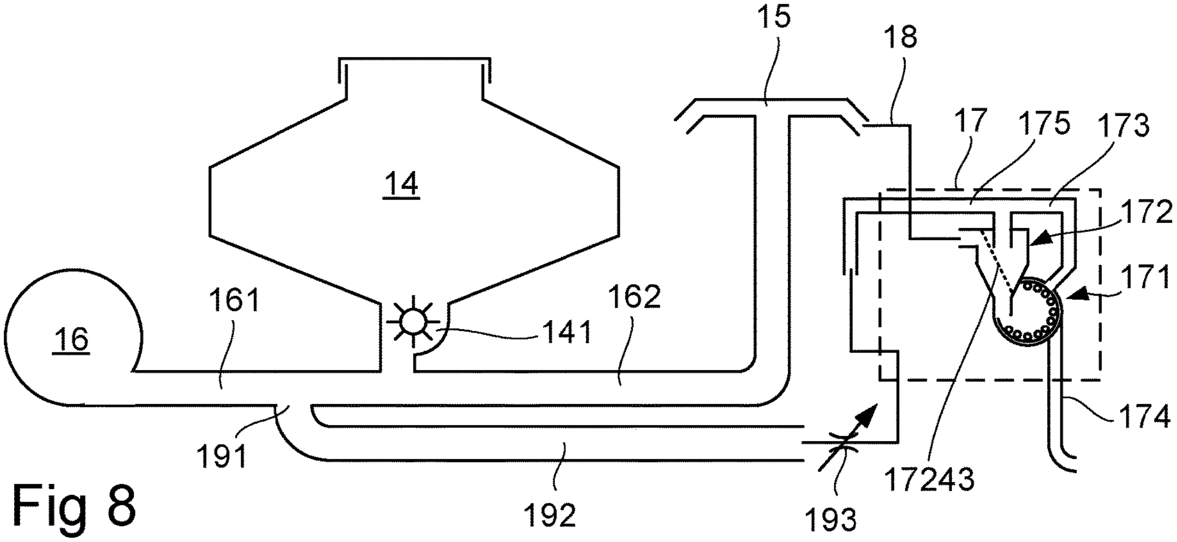
FIG. 8 shows a schematic view of a seventh embodiment of an arrangement for distributing granular material.

FIG. 8 shows a schematic view of a seventh embodiment of an arrangement for distributing granular material. The arrangement shown in FIG. 8 corresponds to what was shown in FIG. 3, but with an alternative embodiment of the separator 172, the latter having been provided with a separator cage, which will be described in more detail below.

In the separator 172 shown in FIG. 8, there is also an apertured wall portion 17243 which can be designed in accordance with what has been described with reference to FIG. 3.

Figure 9:
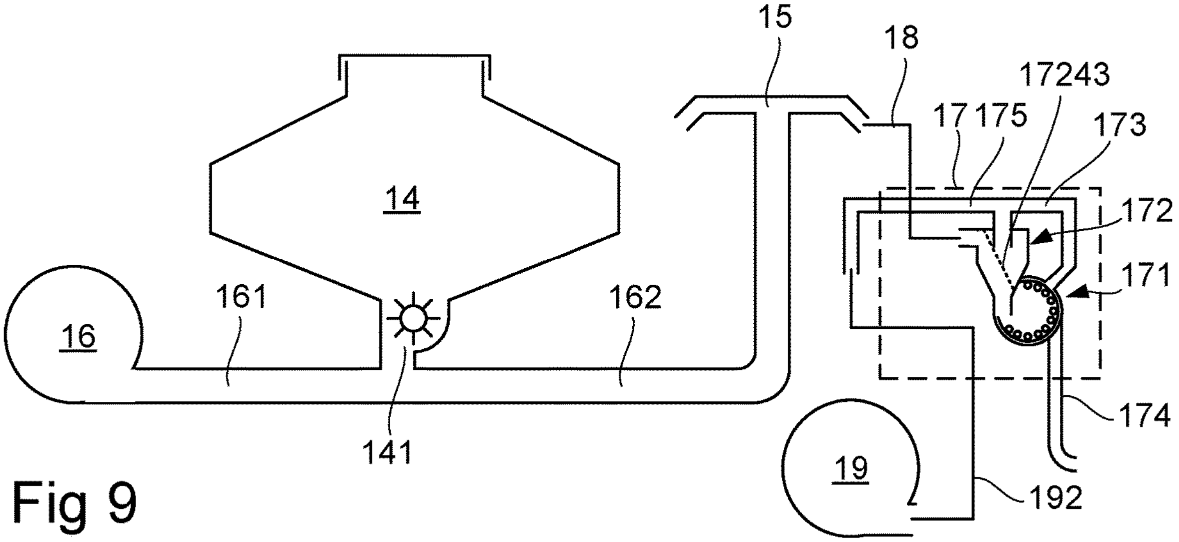
FIG. 9 shows a schematic view of a eighth embodiment of an arrangement for distributing granular material.

FIG. 9 shows an eighth embodiment of an arrangement for distributing granular material. The arrangement shown in FIG. 9 corresponds to what was shown in FIG. 5, but with an alternative embodiment of the separator 172, the latter having been provided with a separator cage, which will be described in more detail below.

In the separator 172 shown in FIG. 9, there is also an apertured wall portion 17243 which can be designed in accordance with what has been described with reference to FIG. 3.

Figure 10A:
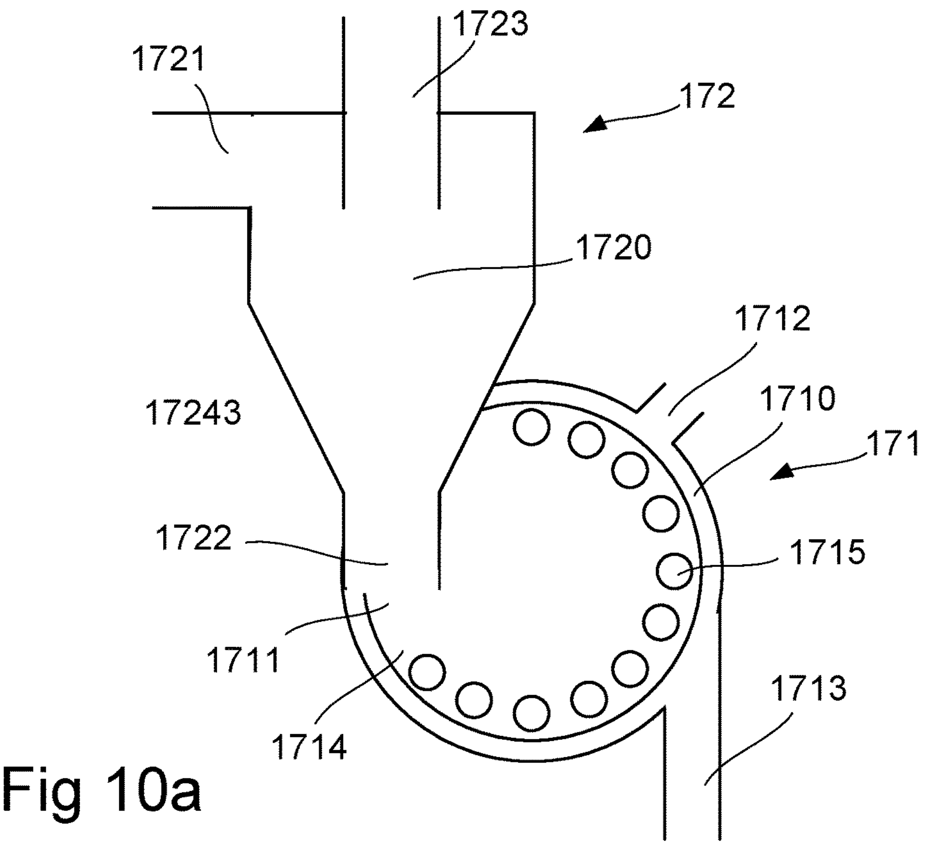
FIG. 10 shows schematic views of a singulating device.
Figure 10B:
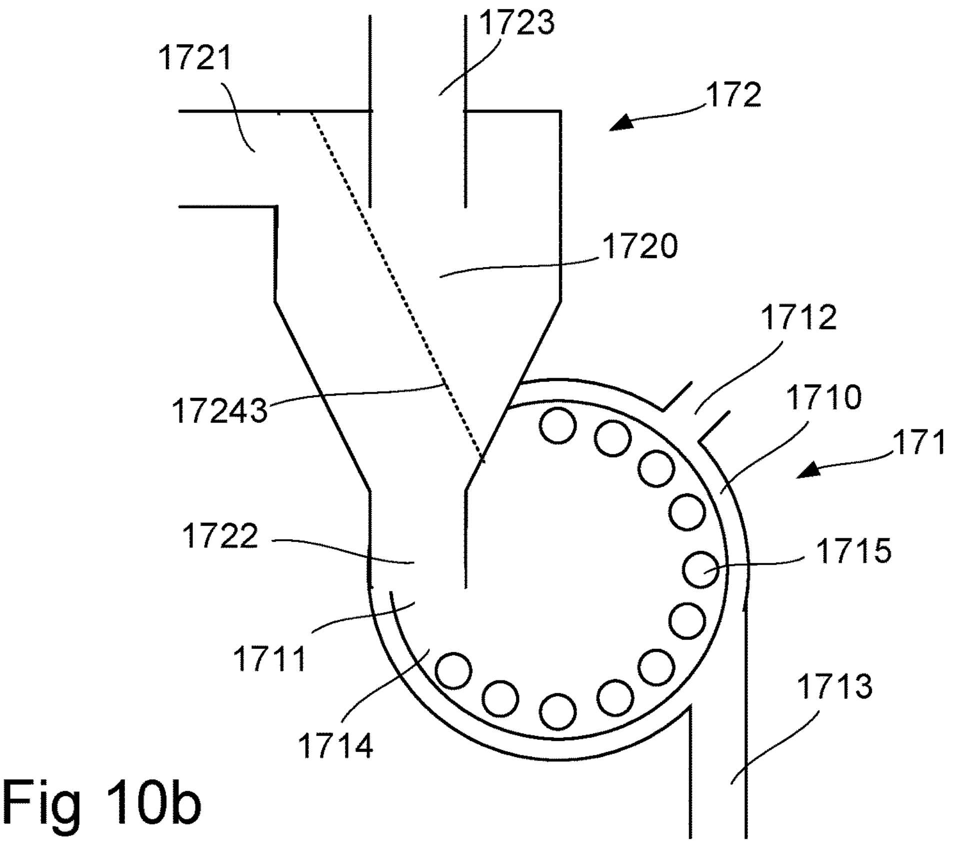

FIGS. 10*a*-10*b* show schematic views of a singulating device 171 with a separator 172.

The singulating device 171 comprises a singulating chamber 1710, which has a material inlet 1711, an air inlet 1712, and an outlet 1713 for singulated material. A singulating part 1714, which is shown here in the form of a singulating disc, is arranged movably in the singulating chamber 1710. The singulating part 1714 has a plurality of through-holes 1715 which have a cross section slightly smaller than the material that is to be singulated. By using air fed to the air inlet 1712 to produce a pressure difference across the singulating part 1714 and allowing the high-pressure side of the singulating part 1714 to move in a part of the singulating space 1710 where material has been fed via the material inlet 1711, material comes to be caught at the holes 1715 and to be entrained by the singulating part 1714 to the outlet 1713, where the pressure difference breaks, such that the material falls down into the outlet 1713. By providing the singulator with sufficient air flow, the part of the air flow that does not pass through the singulating part 1714 is conveyed through the outlet 1713 and there contributes to accelerating and entraining the material.

The singulating part 1714 can be designed as a circular disc or ring which is rotatable about an axis at right angles to the disc, with the holes being present in the base surface of the disc or ring.

Alternatively, the singulating part can be designed as a cylinder which is rotatable about a central axis of the cylinder, with the holes being present in the lateral face of the cylinder.

In order to increase the capacity of the singulating part 1714, the holes 1715 can be arranged in two or more rows and/or can be placed closer together. The capacity of the singulating part 1714 can also be increased by a higher speed of rotation of the singulating disc.

The separator 172 can be designed as a cyclone and can enclose a separator space 1720 that has a substantially circular cross section. An inlet 1721 for the material laden air flow can be present in the upper portion of the separator space. The inlet 1721 can be designed such that it connects tangentially to the separator space 1720, such that an incoming stream of air is deflected. In the lower portion of the separator space, a material outlet 1722 can be present, which can be connected directly to the material inlet 1711 of the singulator 171.

The separator space 1720 can have a portion that narrows, for example conically, in a downward direction.

In the upper portion of the separator space, an air outlet 1723 can be present, which can be connected directly to the air inlet 1712 of the singulator 171.

In the separator 172 shown in FIG. 10*b*, a channel can be arranged which extends from the inlet 1721 to the material outlet 1722 and which, along at least a part thereof, has an apertured wall portion 17243 that allows air through, such that air, but not material, can pass through said wall portion. The channel can be designed as a part that can be mounted releasably in the cyclone separator.

Figure 11:
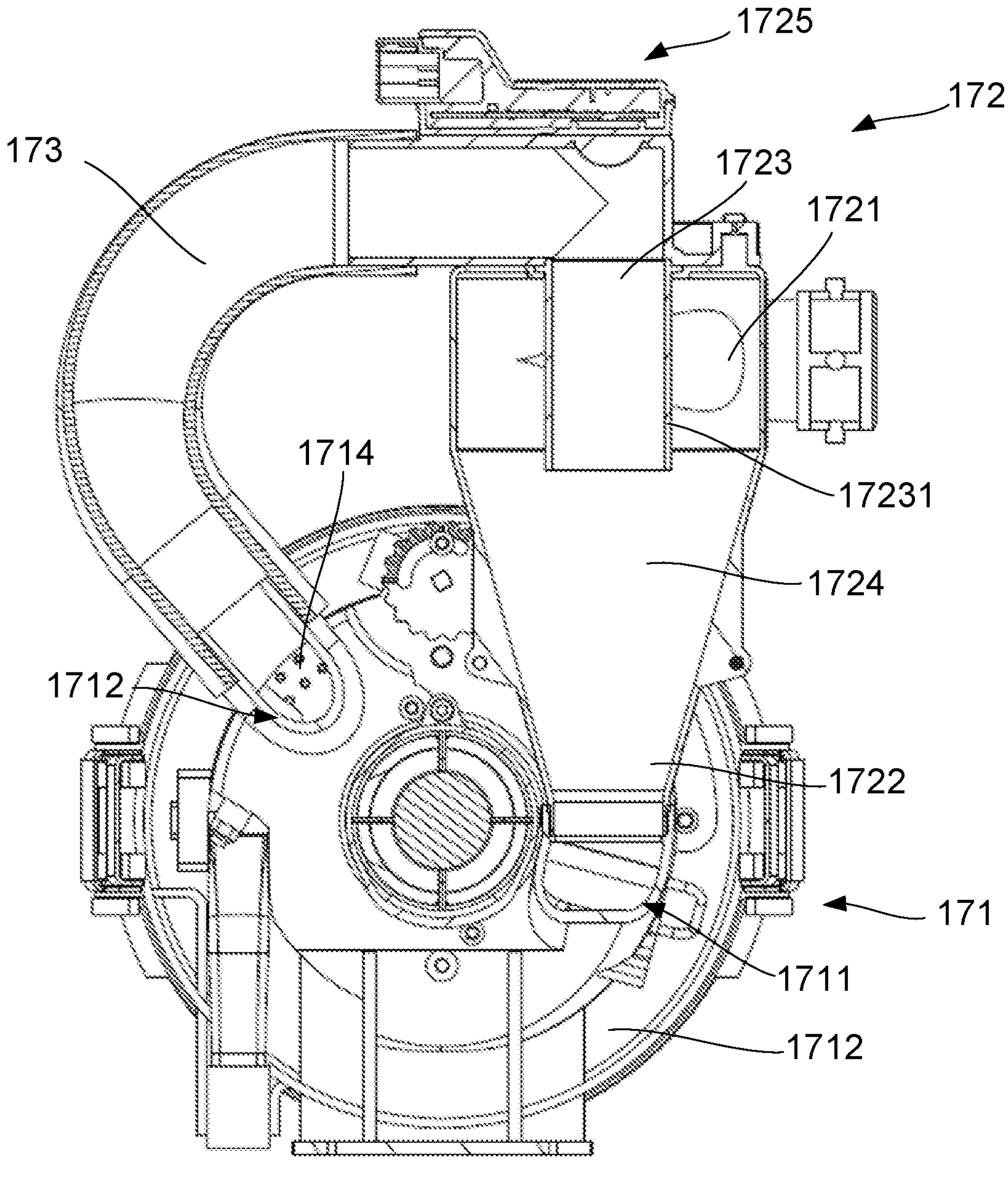
FIG. 11 shows a schematic view of a singulator with separator.

FIG. 11 shows an embodiment of a singulator 171 with separator 172. The separator 172 has an outlet 1723 with an outlet sleeve 17231, which can be substantially circular with solid walls and an opening at the bottom. The outlet sleeve can have an extent in the vertical direction that is greater than the vertical extent of the inlet 1721 of the separator.

Figure 12A:
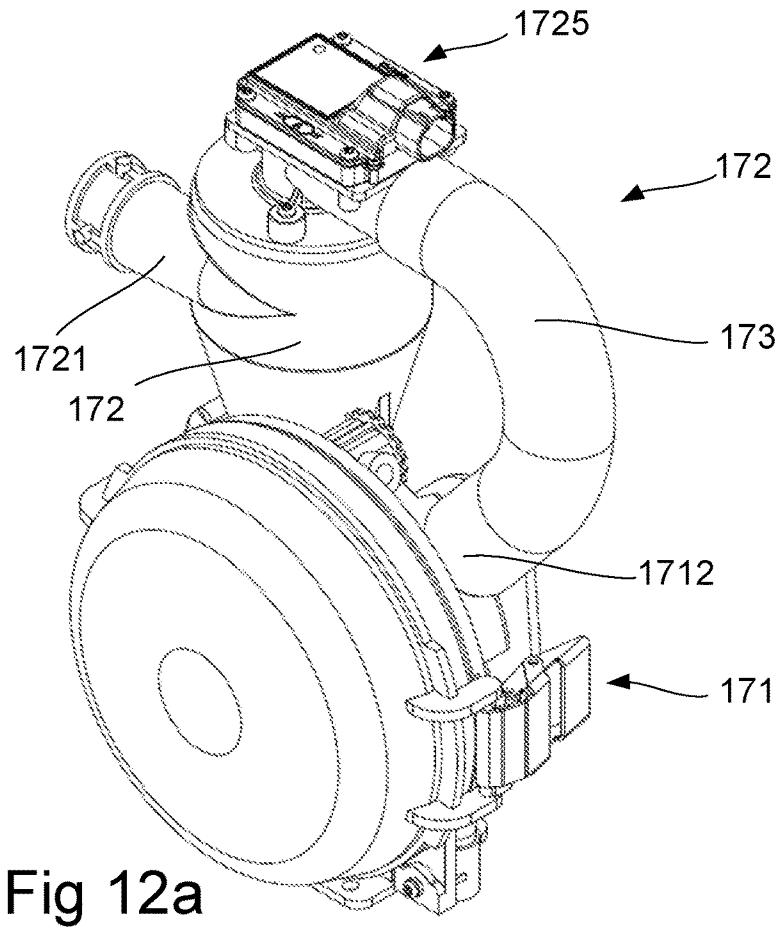
FIGS. 12*a*-12*c* show schematic views of a singulator with separator.
Figure 12B:
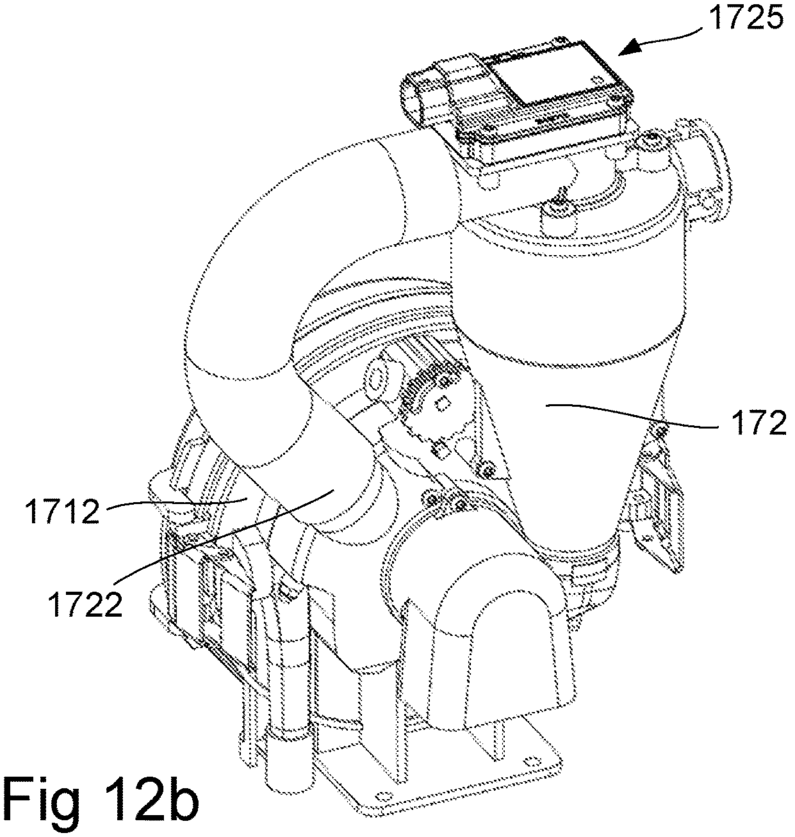
Figure 12C:
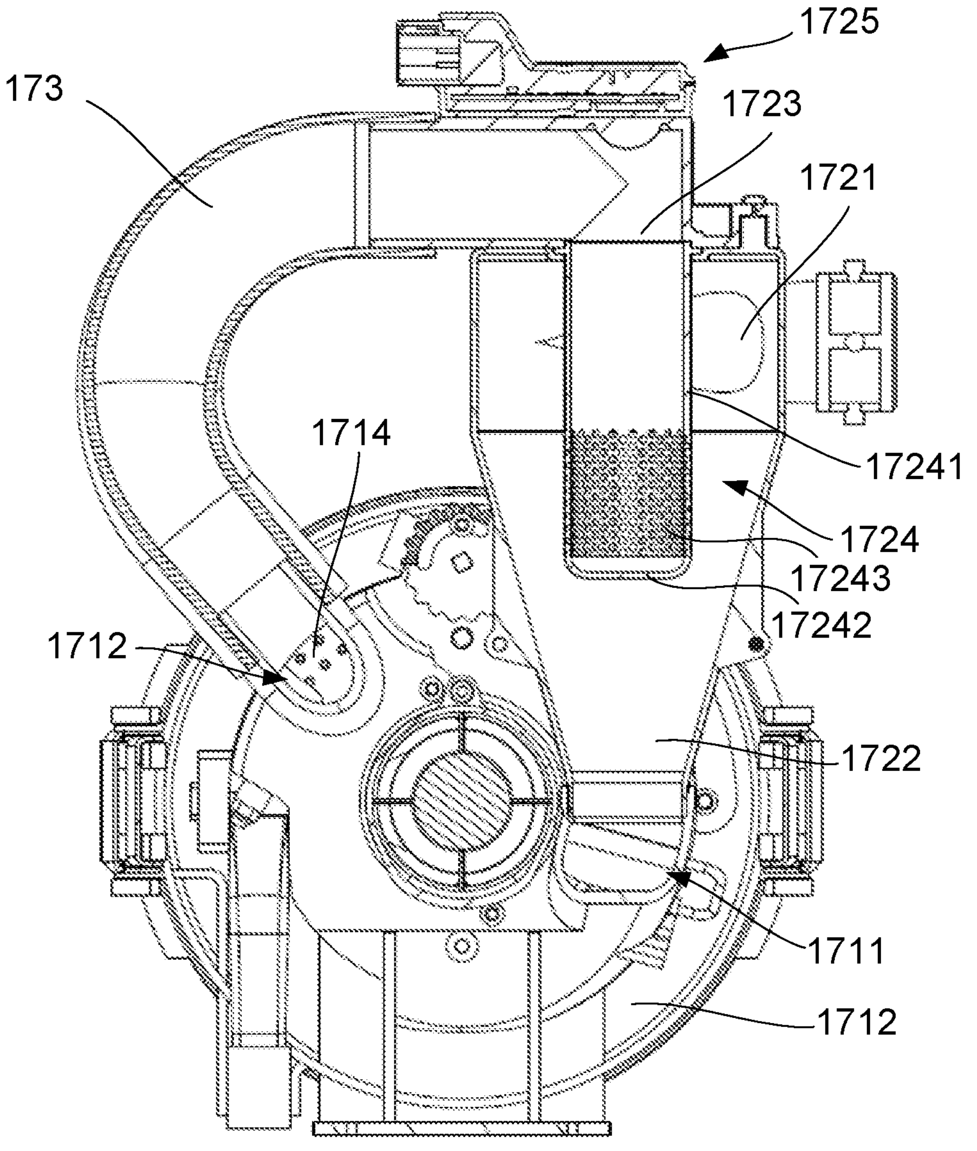

With reference to FIGS. 12*a*-12*c*, an embodiment of a singulator 171 with separator 172 will now be described. In this embodiment, a channel 1724 is mounted at the air outlet of the cyclone separator 172, such that it extends down in the cyclone separator towards the material outlet. The channel 1724 can have a solid wall portion 17241 and a solid bottom 17242; the apertured wall portion 17243 can extend between said solid bottom 17242 and the solid wall portion 17241. The solid wall portion can in turn connect, preferably releasably, to the air outlet 1723 of the cyclone separator.

In the example shown, the channel 1724 is substantially cylindrical; the apertured wall portion 17243 extends as a band around a lower portion of the cylinder. In alternative embodiments, the apertured wall portion 17243 can extend partially around the lower portion of the cylinder.

The through-holes or slits that have been formed in the apertured wall portion 17243 can have a flow area that increases in an air flow direction through the wall portion, in order to avoid material or residues of material from becoming caught.

In the separator 172 shown in FIG. 12*c*, there is also an apertured wall portion 17243, which can be designed in accordance with what has been described with reference to FIG. 3.

Particularly when used with a volumetric feeder, the separator 172 can be provided with a level sensor 1725 for measuring a material level in the separator 172. Such a level sensor can, for example, use ultrasound, radar or light to measure a material level at the material outlet 1722 of the separator. By means of such measurement, a stoppage in the feeding can be identified, and/or the feeding operation can be controlled in order to maintain a predetermined material level in the outlet 1722.

Depending on the type of measurement (radar, optical), the design of the bottom (transparent) and signal processing (filtering of echo from the bottom in the case of radar), it is possible to use the same type of measurement sensor in all applications of the singulator.

When using a level sensor, it is advantageous to control the measurement such that a material level is obtained that is higher than a lower edge of the material outlet 1722 of the separator, since the material then prevents or greatly reduces leakage of air from the separator to the singulator.

It will be appreciated that the channel 1724 can be designed as an exchangeable part, such that a singulator can be easily modified between the embodiment shown in FIG. 12*c* and the embodiment shown in FIG. 11 by means of the outlet sleeve 17231 being replaced by or supplemented by a channel 1724, or vice versa.

The invention claimed is:

1. An agricultural implement for distributing granular material to ground over which the agricultural implement is travelling, comprising:

a container for the material, a fan for producing an air flow in a primary channel, a driveable volumetric feeder unit for feeding the material to the primary channel, such that an material laden air flow is produced, a plurality of secondary channels for transporting the material laden air flow, and a plurality of output units which are each connected to one of said secondary channels and have an outlet channel for discharging the material to the ground, wherein each of the output units comprises a singulator, which has a singulating part which is movable in a singulating space and has a plurality of through-holes or recesses, and over which a pressure difference can be applied, such that the singulating part has a high-pressure side and a low-pressure side, wherein the singulator has a material inlet and an air inlet, which connect to the singulating space on the high-pressure side, wherein a material outlet of the singulator connects to the outlet channel, and wherein said air flow is used for pressurizing the singulator.

2. The agricultural implement according to claim 1, wherein at least some of the output units comprise a separator.

3. The agricultural implement according to claim 2, wherein the separator comprises an inlet connected to one of the secondary channels, a material outlet connected to the material inlet of the singulator, and an air outlet connected to the air inlet of the singulator.

4. The agricultural implement according to claim 2, wherein the separator comprises at least one of:

a cyclone separator, a separator of the filter type, and a gravitational separator.

5. The agricultural implement according to claim 2, wherein the separator and the singulator are mounted releasably on each other.

6. The agricultural implement according to claim 2, wherein the separator and the singulator are integrated with each other.

7. The agricultural implement according to claim 3, wherein the separator has a separator space of substantially circular cross section, wherein the inlet is designed such that it produces a direction of flow which is substantially tangential with respect to the separator space, wherein the material outlet is located at a lower part of the separator space, and wherein the air outlet is located at an upper portion of the separator space.

8. The agricultural implement according to claim 7, wherein at least a lower portion of the separator space narrows in a downward direction.

9. The agricultural implement according to claim 3, wherein the separator comprises a channel having a wall portion which is apertured over at least part thereof, such that air but not material can pass through the wall portion to the air outlet.

10. The agricultural implement according to claim 1, further comprising a distributor, which has a distributor inlet connected to the primary channel, and a plurality of distributor outlets, which connect to a respective singulator.

11. The agricultural implement according to claim 2, further comprising a level sensor for measuring a material level at the material outlet of the separator and/or in the singulating space.

12. The agricultural implement according to claim 3, wherein said connection between the air outlet of the separator and the air inlet of the singulator is the only source the singulator has to a positive air pressure.

13. The agricultural implement according to claim 3, wherein a further source of positive air pressure is connected to the air inlet of the singulator.

14. The agricultural implement according to claim 13, wherein said further source of positive air pressure is a second fan.

15. The agricultural implement according to claim 13, wherein said further source of positive air pressure is a channel which connects to the primary channel upstream of the container.

16. The agricultural implement according to claim 1, further comprising a bypass channel, for selective bypassing of the singulator, such that said material laden air flow is conveyed directly to an outlet.

17. The agricultural implement according to claim 1 wherein all of the output units comprise a separator.

18. An agricultural implement for distributing granular material to ground over which the agricultural implement is travelling, comprising:

a container for the material, a fan for producing an air flow, a plurality of take-up zones to which the material falls by gravity from the container in order to be taken up by the air flow, such that an material laden air flow is obtained, a plurality of primary channels, each connected to a respective take-up zone, for transporting the material laden air flow, a plurality of output units which are each connected to one of said primary channels and have an outlet channel for discharging the material to the ground, each of the output units comprise:

a separator comprising an inlet connected to one of said primary channels, a material outlet and an air outlet, a singulator, which has a singulating part which is movable in a singulating space and has a plurality of through-holes or recesses, and over which a pressure difference can be applied, such that the singulating part has a high-pressure side and a low-pressure side, a material inlet connected to the material outlet of the separator, and an air inlet connected to the air outlet of the separator, wherein the material inlet and air inlet of the singulator connects to the singulating space on the high-pressure side, wherein a material outlet of the singulator connects to the outlet channel, wherein the separator comprises a cyclone separator, and a wall portion arranged in the cyclone separator, wherein the wall portion is apertured such that air, but not the material, can pass through the wall portion to the air outlet.

19. The agricultural implement according to claim 18, wherein the wall portion is arranged releasably relative to the cyclone separator.

20. The agricultural implement according to claim 18, wherein the wall portion extends substantially vertically in the cyclone separator, such that an air flow through the material portion can be reduced as the material level increases in the cyclone separator.

21. The agricultural implement according to claim 18, wherein said air flow is used for pressurizing the singulator.

* * * * *